United States Patent [19]

Aruga et al.

[11] Patent Number: 4,483,747

[45] Date of Patent: Nov. 20, 1984

[54] MONOMER REMOVAL FROM THE SLURRY OF VINYL CHLORIDE RESIN WITH STEAM BY USING IMPROVED PLATE TOWER

[75] Inventors: Shiro Aruga; Kazuaki Nakano; Kyuichi Mito; Kei Mukai, all of Minamatashi; Mikio Shinkai, Chibashi, all of Japan

[73] Assignee: Chisso Corporation, Osaka, Japan

[21] Appl. No.: 306,700

[22] Filed: Sep. 29, 1981

Related U.S. Application Data

[63] Continuation of Ser. No. 968,097, Dec. 8, 1978, abandoned, which is a continuation of Ser. No. 875,850, Feb. 8, 1978, abandoned.

[30] Foreign Application Priority Data

Jun. 21, 1977 [JP] Japan .................................. 52-77480

[51] Int. Cl.³ ...................... B01D 3/38; C08F 114/06
[52] U.S. Cl. ......................................... 203/92; 203/23; 203/96; 159/16 S; 159/47.1; 202/158; 202/234; 526/344.2; 526/345; 528/500; 528/501
[58] Field of Search ..................... 203/92, 93, 96, 97, 203/95, 23, 88, 85, 79; 528/500, 501; 202/234, 158; 159/16 S, 47 R; 526/344.2, 345

[56] References Cited

U.S. PATENT DOCUMENTS

| | | | |
|---|---|---|---|
| 2,433,060 | 12/1947 | Ohsol et al. ............................ | 528/50 |
| 2,608,397 | 8/1952 | Treub ................................. | 202/158 |
| 2,870,065 | 1/1959 | Mitchell ............................... | 203/92 |
| 2,927,065 | 3/1960 | Gerlicher et al. ...................... | 528/500 |
| 3,168,600 | 2/1965 | Martin ................................ | 202/158 |
| 3,172,922 | 3/1965 | Kehse ................................. | 202/158 |
| 3,321,380 | 5/1967 | Hillburn .............................. | 203/23 |
| 3,337,422 | 8/1967 | Colton ................................ | 528/500 |
| 3,461,677 | 8/1969 | Muenger .............................. | 202/158 |
| 3,469,618 | 9/1969 | Siclari ................................. | 528/500 |
| 3,717,553 | 2/1973 | Otsuki et al. ......................... | 202/158 |
| 3,926,927 | 12/1975 | Stookey ................................ | 203/96 |
| 3,975,230 | 8/1976 | Yang et al. ............................ | 203/96 |
| 4,017,445 | 4/1977 | Grosse-Wortmann et al. ......... | 528/500 |
| 4,086,414 | 4/1978 | Hornbaker et al. .................... | 528/500 |

Primary Examiner—Wilbur Bascomb
Attorney, Agent, or Firm—Fred Philpitt

[57] ABSTRACT

A method for removing vinyl chloride monomer rapidly from a large amount of slurry of vinyl chloride resin to give waste water separated from said slurry, exhaust gas used in the drying of separated resin and resin product which are not objectionable from the environmental sanitation or to produce such a treated slurry which can give waste water separated from said slurry, exhaust gas used in the drying of separated resin and resin product which are not objectionable from the environmental sanitation by the repetition of said method. In said method a slurry of vinyl chloride resin is caused to flow down a plate column in which flow of slurry on the trays in each step of plates is treated with steam in a combination of specified plates and specified conditions of treatment.

4 Claims, 8 Drawing Figures

MONOMER REMOVAL FROM THE SLURRY OF VINYL CHLORIDE RESIN WITH STEAM BY USING IMPROVED PLATE TOWER

RELATED APPLICATIONS

This is a continuation of application Ser. No. 968,097, filed Dec. 8, 1978 and the benefits of 35 USC 120 are claimed relative to it.

Application Ser. No. 968,097 is a continuation of our prior application Ser. No. 875,850, filed On Feb. 8, 1978 and we claim the benefits of 35 USU 119 and 120 relative to it. Both applications Ser. Nos. 968,097 and 875,850 are now abandoned.

DESCRIPTION

This invention relates to a method for removing vinyl chloride monomer from a slurry of vinyl chloride resin. More particularly it relates to a novel improvement in a method for removing vinyl chloride monomer from a slurry of vinyl chloride resin by blowing steam into said slurry flowing down in a plate column, and stripping off remaining monomer together with generated water vapour.

A slurry of vinyl chloride resin is prepared by polymerising vinyl chloride monomer suspended in an aqueous medium and separating and recovering unpolymerized monomer after completion of the polymerization. Then the slurry of vinyl chloride resin has the aqueous medium separated by a mechanical means and separated resin is dried by a hot drying gas stream or various kinds of other methods to produce dried powder of vinyl chloride resin.

Whereas the above-mentioned aqueous medium separated from resin, the exhaust of hot drying gas stream and the dried powder of vinyl chloride resin contain small amounts of vinyl chloride, monomer, the amount is regarded to be clearly injurious or questionable by reason of environmental sanitation.

Various methods have been proposed in order to completely remove vinyl chloride monomer remaining in such discharged materials or powder of vinyl chloride resin or reduce its content to the extent that it is non-injurious from the point of environmental sanitation. A method has been disclosed in which wet powder of vinyl chloride resin (so-called wet cake) or a slurry of vinyl chloride resin is treated with steam to separate and vaporize the vinyl chloride monomer occluded or included in said powder of resin or said slurry of resin, together with the steam generated by said treatment (Japanese patent publication No. 1955 of 1977; Japanese laid-open patent application No. 50991 of 1976). However, the optimum ranges of concrete conditions (vinyl chloride concentration in the raw material resin, optimum time, temperature, etc. of the treatment) of these methods are relatively narrow and there are often cases where the removal effect of vinyl chloride monomer from said powder is insufficient depending upon the polymerization degree and the powder form of the vinyl chloride resin.

Accordingly, we have been endeavoring to find an easy and rapid method which is suited for the large scale treatment of a slurry of vinyl chloride resin which is being produced in a large amount with various kinds of quality and capable of producing the above-mentioned separated waste water, exhaust drying gas and powder of vinyl chloride resin (hereinafter referred to as vinyl chloride resin product) which do not contain such an extent of vinyl chloride monomer which would be injurious from the point of environmental sanitation and found that the use of special trays in a plate tower and a combination thereof with specified conditions (temperature, pressure, retention time, etc.) in the treatment of slurries of vinyl chloride resin which is caused to flow down through in a plate tower and contacted during the course of the flow thereof on each tray of the plate tower with steam provides a vastly superior effect in stripping off remaining vinyl chloride monomer.

As is evident from the foregoing explanation, the first object of the present invention is to provide a method for removing vinyl chloride monomer included in a slurry of vinyl chloride resin by treating said slurry in a large amount, rapidly and efficiently with steam. The second object of the present invention is to provide a treated slurry of vinyl chloride resin which does not allow the separated waste water of said slurry after said removal, gas used in drying and vinyl chloride resin products to contain vinyl chloride monomer in an amount injurious to environmental sanitation. The third object of the present invention is to provide a method which enables one to separate and recover the vinyl chloride monomer separated in the above-mentioned treatment. Other objects will become apparent from the description which hereinafter follows.

The present invention resides in the following methods (1)–(9).

(1) In the method for removing vinyl chloride monomer in the resin as well as in the dispersing medium by treating the aqueous dispersion of the powder of vinyl chloride resin flowing down through a plate tower, the improvement in the removal of the remaining monomer which comprises letting said aqueous dispersion flow down through a plate tower having a series of channel-like flow paths from the inlet of liquid to the outlet upon the trays of said plate tower; said outlet of one tray being connected with inlet of next tray by over-flow while maintaining liquid sealing between the space upon one tray to another; contacting said aqueous dispersion flowing through said channel-like flow path with steam supplied from a large number of small holes uniformly distributed all over the surface of the trays, having a diameter of 0.5–2 mm, the ratio of the total sum of the cross-sectional area of holes to cross-sectional area of tray being in the range of 0.04–0.0004; under the condition of a pressure of $-0.803 \sim 0.5$ kg/cm$^2$ G, at a temperature of 80° C.–110° C. and a retention time on the trays of 1–60 minutes.

(2) A method according to item (1) wherein said plate tower has a combination of two or more than two said trays, a slurry of vinyl chloride resin is fed from the top of the plate tower in the liquid sealing state and the treated slurry is discharged from the column base also in the liquid sealing state, treating steam is fed to the column base and/or to the tray chambers formed with and between the trays and separated vinyl chloride monomer is discharged from the top of the plate tower or column together with generated steam.

(3) A method according to item (1) or (2) in which the temperature of the fed slurry of vinyl chloride resin is in the range of 50° C. to 100° C., the temperature of the slurry retained on the trays is in the range of 50° C. to 110° C. and the temperature of discharging slurry is in the range of 60° to 110° C.

(4) A method according to item (1)–(3) wherein the retention time of the slurry of vinyl chloride resin is in the range of 1 to 90 minutes preferably 3 to 60 minutes, and most preferably 3 to 30 minutes.

(5) A method for recovering vinyl chloride monomer according to item (1)–(4) in which a mixture of steam and vinyl chloride monomer discharged from the top of the plate tower is condensed by cooling followed by phase separation of liquid.

(6) A method according to item (1)–(5) wherein a discharged treated slurry is recirculated by itself alone or together with a new slurry of vinyl chloride resin.

(7) A method according to item (1)–(6) wherein the fed slurry of vinyl chloride resin is subjected to heat-transfer in a heat exchanger with a discharging treated slurry.

(8) A method according to item (1)–(7) wherein the discharging treated slurry is cooled by suddenly flashing under vacuum.

(9) A method according to item (1)–(8) wherein said vinyl chloride is a copolymer of vinyl chloride with other vinyl monomer containing at least 50% by weight vinyl chloride unit.

Explanation will be given with regard to the constitutional elements and the effectiveness of the present invention.

a. Plate column

For the treatment of a slurry of vinyl chloride with steam according to the method of the present invention a so-called plate column, plate tower or tray tower is used. A plate column has stepwise arranged plates generally in the upward and downward direction of the column. The trays constituting each step of the tray tower may include a flat plate, a tray form plate, a sieve plate, a perforated plate, a bubble cap plate, etc. In the method of the present invention, special perforated plates or trays hereinafter described are used. There is no limitation as to column diameter but it is convenient to use those having a column diameter of 0.3 to 3 m and particularly a diameter of 0.5 to 2 m. In case of the above-mentioned column diameter, the amount of slurry of vinyl chloride resin used as 1 $m^3$ to 300 $m^3$ preferably 5 $m^3$ to 100 $m^3$ per hour per column for the concentration of resin of slurry of 25% by weight. There is no limitation as to the column height but it is convenient to use those having a column height 5 to 20 times preferably 5 to 15 times the column diameter.

b. An aqueous dispersion of powder of vinyl chloride resin to be caused to flow down It is a slurry of vinyl chloride resin obtained generally by subjecting vinyl chloride monomer to suspension polymerization in an aqueous dispersion medium according to a conventional process and separating unpolymerized monomer under atmospheric pressure after completion of the polymerization and contains vinyl chloride monomer in an extent of less than 40,000 ppm to 500 ppm depending upon the polymerization condition and recovering method of unpolymerized monomer after polymerization. As for chemical composition of powder of vinyl chloride resin, there are included copolymers of vinyl chloride and other vinyl monomer e.g. vinyl acetate, alkylvinyl ether, including olefins, acrylate or methacrylate) containing 50% by weight or more of vinyl chloride unit. An aqueous dispersion is a so-called slurry of vinyl chloride resin consisting of water, a suspending agent e.g. polyvinyl alcohol and other necessary adjunct or an aqueous medium consisting of water and an organic solvent and the above-mentioned powder of vinyl chloride resin but also includes an aqueous emulsion of vinyl chloride resin prepared according to an emulsion polymerization process so long as it is the one to which the method of the present invention is applicable.

The aqueous dispersion fed to a tray of relatively higher position of a plate column flows downward by gravity and passes stepwise through each of the tray chambers in the method of the present invention. The tray chambers herein refered to means the spaces formed with and between trays or formed with the top tray and a cover over it. Incidentially though detailed later, since said slurry supplied to the tray constituting each step flows in overflow manner, it does not flow down to the trap of the next step until the tray (substantially the tray) to which the slurry is being fed is filled up. Further there is no occurrence of the depositing of wet powder of vinyl chloride resin upon the trays nor back mixing of said slurry during the retention time in the trap plate because of the reason hereinafter described and these points constitute the essential part of the invention of the present invention.

c. Trays used in each step of plate column

The reason for the steam treatment of slurry of vinyl chloride resin by using a plate column is to bring said slurry sufficiently in contact with steam to effect gas liquid contact and to increase thermal efficiency by the multiple use of steam in the chamber of each step. It is clear from the object of the present invention that the use of a plate column is not merely for extending the retention time of the slurry of vinyl chloride resin in a plate column. On the contrary, in order to shorten the retention time and to narrow the dispersion of variation in retention time, as a structure of plate, the one having a series of channel-like flow paths as shown in the attached drawing was used.

A method and apparatus of the present invention will be described with reference to the attached drawings, wherein.

Figure 1A:
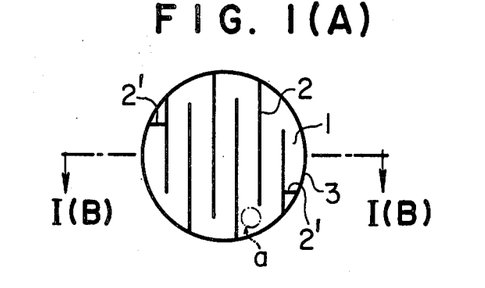
FIG. 1(A) is a schematical plan view of the trays for the plate tower used in the method of the present invention.
Figure 1B:
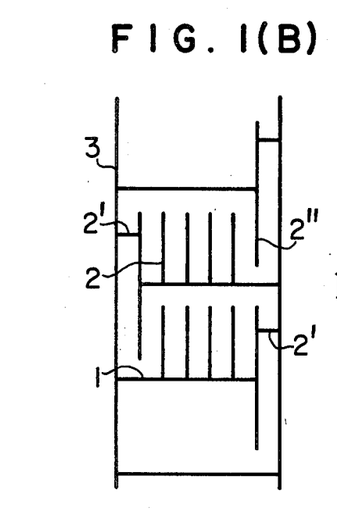
FIG. 1(B) is a schematical vertical cross-sectional view through 1(B)-1(B) of FIG. 1(A) of the trays for the plate tower used in the method of the present invention wherein a combination of two trays is used.

In FIGS. 1(A) and (B), 1 is a bottom plate, 2 are side plates which form channel-like flow path for liquid in the tray. 2' is a plate used for forming liquid level by overflow (weir). 2" is a side plate 2 which extends downward into the liquid of the tray chamber of the next lower step wherein the lower end part thereof is submerged in the liquid there to form liquid feed as well as side plate of the tray chamber of the next lower step.

Figure 1C:
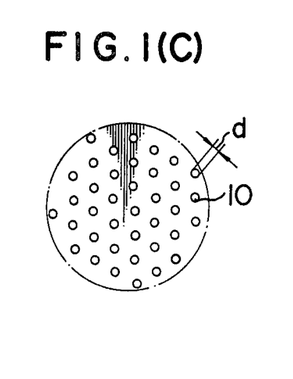
FIG. 1(C) shows a plan view of enlargement of an encircled part "a" of FIG. 1(A).
Figure 3:
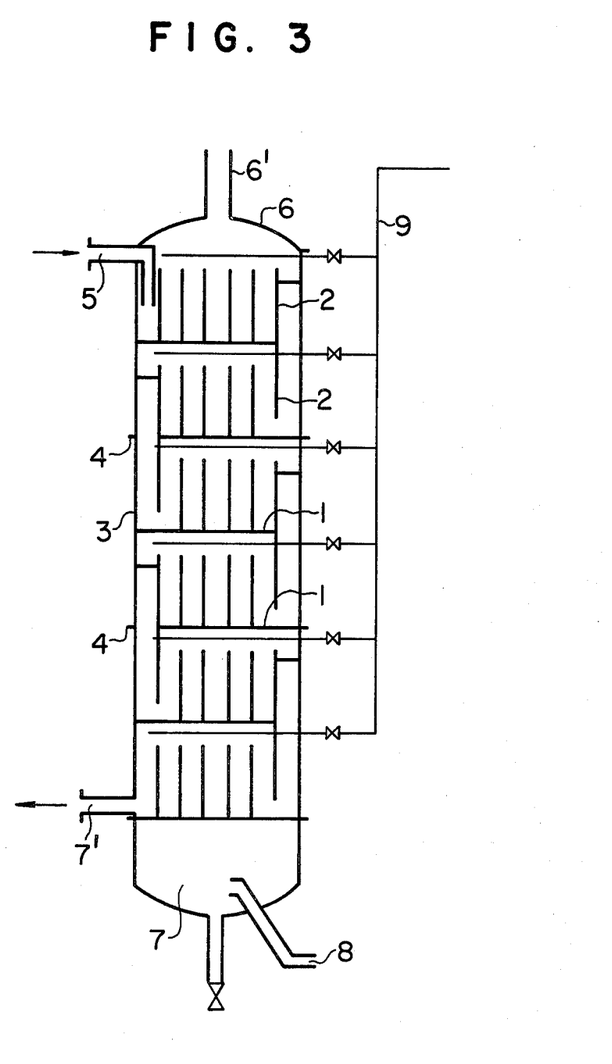
FIG. 3 is a schematical vertical cross-sectional view of a plate tower used in the method of the present invention.

As shown in FIG. 1(C), the bottom plates of the trays of FIG. 1(A) are provided with a number of small holes 10 (0.5–2 mm in diameter d) uniformly distributed all over their entire surface. The ratio of the sum of the cross-sectional area of said small holes to the total area of the bottom plate (excluding the area of the part occupied by the joint of the side plates 2 and 2') is in the range of 0.04–0.0004 preferably 0.02–0.002. The outer circumferential side plate 3 of the tray in FIG. 1(B) is constructed integrally with the plates of upper and lower trays, but it is also possible to build these plates separately and connect them with the plates of trays air-tightly by flanges or the like. It is possible to construct as above-mentioned in such a way that the side plate 3 form directly the shell of a plate column. In place of the tray of FIG. 1(A) and 1(B), it is also possible to use trays having a structure shown in FIG. 2(A) and (B) in their cross-section. In the plane view of FIG. 2(A), volute form of channel-like flow paths are formed in which side plates are not crossed with each other and flow of slurry is directed to the center of volute or vice verse (meanings of numerals are the same with those of FIG. 1).

d. A plate column used in the method of the present invention in which a plurality of trays above-mentioned in (C) are fitted The vertical cross-sectional view is illustrated in FIG. 3. In the drawing, 3 is the shell part of a column forming simultaneously an outer side plate of a channel. Said shell part 3 containing two trays 1 as one set within this part, and is connected above and below it by means of the upper and lower shell parts with flanges 4.

Further 5 is a feed port for slurry of vinyl chloride resin which is connected to a feeding pipe of said slurry. 6 is a top cover and 6' is a discharging outlet of a mixture of steam and vinyl chloride monomer. 7 is a bottom chamber of column. 7' is a withdrawal outlet of treated slurry. 8 is an inlet of blowing-in steam. 9 is a piping for washing water.

e. Embodiment of the method of the present invention

Figure 4:
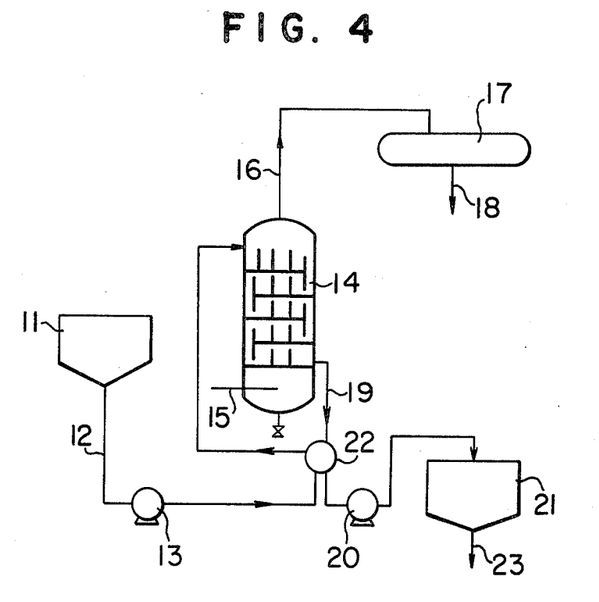
FIG. 4 is a schematical flow sheet for carrying out the method of the present invention.

From the top of the column illustrated in FIG. 3, a to be treated vinyl chloride slurry is caused to flow in while keeping the liquid seal state. The liquid seal state means the arrangement for preventing gas such as water vapour, vinyl chloride monomer, etc. from escaping. The feed port 5 is generally connected to a piping 12 of FIG. 4. The supplied slurry fills the tray of the uppermost tray chamber, fills the trays of the next step by over-flow and by overflowing in the same manner it reaches the tray immediate upon the lowermost column bottom chamber 7 and is led to a next step of dehydration step (FIG. 4, 23). Further steam is blown from a steam blowing-in port 8 fitted to the bottom chamber 7 of the column in an adequate amount under adequate pressure, absorbed into a slurry of vinyl chloride resin retained on the tray of each tray chamber from a number of small holes provided on the bottom plate of the tray of the lowermost tray chamber. It heats said slurry to generate a mixed vapour of water having a lower temperature than that of blowing-in steam, and vinyl chloride monomer. Since the inner pressure of the column bottom chamber 7 is maintained at a value slightly higher than the pressure of the lowermost tray chamber plus a liquid head of the slurry of vinyl chloride resin on the tray of said tray chamber, there will be no flow-down of said slurry or water from the above-mentioned small holes. Such a relationship of pressure difference is likewise maintained between each tray chamber i.e. the pressure of the lower tray chamber is maintained at a value higher than the pressure of the upper tray chamber plus a head of retained liquid, hence there will be no flow-down of said slurry or water from the small holes of the tray of each tray chamber. What makes possible the prevention of flow-down is not only the above-mentioned pressure difference but also the small diameter of the small holes in the range of 0.5–2 mm preferably 0.7–1.5 mm which makes the counter-flow of flow-down slurry against ascending steam and the like substantially impossible. Further, the occurrence of clogging of said small holes due to wet powder of vinyl chloride resin is actually non-existent or extremely small. This reason seems to be due to the fact that the diameter of the powder of vinyl chloride resin is considerably smaller than the diameter of the small holes in general and it is considered on one hand that in such a small size the bridge forming of agglomerated powder does not occur in the inside of the small holes.

Figure 2A:
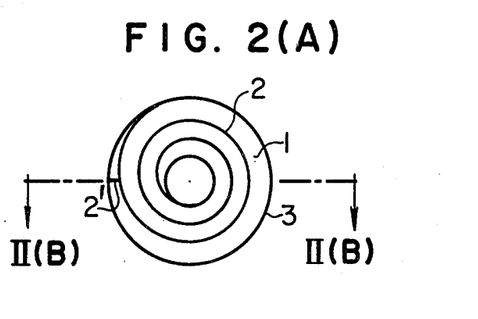
FIG. 2(A) is a plan view of the trays having a different structure for the plate tower used in the method of the present invention.
Figure 2B:
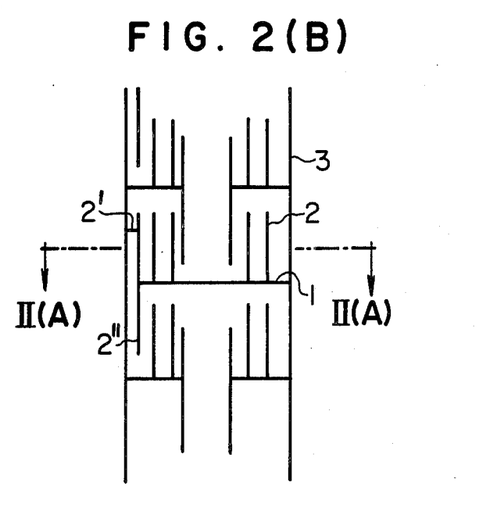
FIG. 2(B) is a schematical vertical cross-sectional view through IIB-IIB of FIG. 2(A) of the trays having different structure for the plate tower used in the method of the present invention.

The slurry of vinyl chloride resin forming retained liquid in each tray chamber moves while keeping the flow state close to piston flow from the inlet toward the outlet on the tray having the channel-like flow path as illustrated in FIG. 1 or 2. Said "piston flow" means a flow state in which a fluid flows at a uniform flow rate in the cross-section of a flow path as if a piston moves. In the present invention, a small agitating action of vapour going up through the slurry on a tray as well as a frictional resistance of the wall make the flow state of the slurry differ from the piston flow. Forming of flow state close to piston flow by the slurry means that the polymer particles in the slurry pass each tray at approximately the same retention time and this is one of the important elements of the present invention because occurrence of large back-mixing-flow means partial existence of particles having extremely long retention time and particles that have undergone such a long heat career causes heat deterioration even under the heat treatment conditions of the present invention, resulting in ultimate injury of the quality of the vinyl chloride resin product. During this time said slurry is agitated mainly in an upward and downward direction by the blowing-in of mixed vapours from the above-mentioned small holes and deposit and separation of wet powder of vinyl chloride resin in said slurry are prevented and simultaneously said slurry is heated to desorb and evaporate, vinyl chloride monomer absorbed in the wet powder to form mixed vapour going to the tray chamber immediately thereupon, together with steam formed by reevaporation. The slurry of vinyl chloride resin which is the retained liquid increases its own liquid level by several to about 20% greater than the calculated value at the time of still standing by the liquid expansion caused by the blowing-in of the mixed vapour from the lower step tray chamber. The necessary amount of steam for keeping the state of the tray chambers as above-mentioned, is from 1 to 100 Kg, preferably 5–50 Kg per 1 $m^3$ of a slurry of vinyl chloride resin (having a standard content of resin of 25%) per hour (which varies depending upon the number of plates (step), ratio of areas of small holes and velocity of pass. As illustrative dimension of trays shown in FIGS. 1(A) and 1(B) and FIGS. 2(A) and 2(B), a diameter of bottom plate 1 of 120 cm, a width of flow path of 17 cm, a height of side plate 2 of 65 cm and a height of side plate of weir 2' of 40 cm and a height of the tray chamber at the time of use of 70 cm can be mentioned. The ratio of the total sum of area of numberless small holes having a hole diameter in the range of 0.5–2 mm to the area of a bottom plate is, as mentioned in (C), in the range of 0.04–0.0004, preferably 0.02–0.002. If said ratio of area is less than 0.0004, the present invention is inoperable due to insufficiency of steam treatment. If it is greater than 0.04, a greater amount of steam is necessary and the effectiveness of removal of vinyl chloride is not notably increased.

In the method of the present invention, increase of heat efficiency is made by utilizing steam in each of the tray chambers in multiple ways but heat economy can be further improved by carrying out heat transfer between the slurry to be fed to a plate tower and the slurry to be discharged therefrom. This is significant because the slurry to be fed contains a large amount of water having a large value of specific heat. Furthermore since the slurry discharged from a plate tower is of relative higher temperature, and the exposure of vinyl chloride resin in the temperature condition like that, has a danger of spoiling the qualities of said resin, the immediate heat transfer between discharging slurry and feeding slurry with a heat exchanger, means dual effect of increase of heat economy and prevention of quality degradation. In case of a kind of vinyl chloride resin having the tendency of notable quality degradation by heat it is possible to cool discharged slurry quickly by flashing it to the atmosphere of reduced pressure as shown in the Japanese laid-open patent application No. 64588 of 1976.

f. Embodiment of the present invention (Condition of operation):

The operation conditions in the method of the present invention will be explained by referring to the flow sheet of the method of the present invention shown in FIG. 4.

In this drawing, 11 is a slurry tank for vinyl chloride resin provided with, though not shown, usually receiving piping, a stirring apparatus for preventing deposit of resin powder, and a water seal device for sealing a gaseous phase from the atmospheric air. Though there is no limitation for capacity, it is preferable to have a capacity which can sustain from one or more than one hours to several hours for the slurry treating capacity ($m^3$/hr) of a plate tower 14, because the operation of a plate tower used in the method of the present invention is preferably continued for a long period of time in order to avoid the time loss from reopening of operation after a stop to the stationary operation but receiving of slurry of vinyl chloride resin to the above-mentioned slurry tank 11 is mostly intermittent due to the intermittent nature of the operation of vinyl chloride polymerization. Said slurry is fed to a column top tray chamber of a plate column 14 after passing through a feed piping 12, a pump 13, and a heat exchanger 22 where said slurry is heated with discharged liquid and further in a preheater (not shown). Liquid temperature is in the range of 50°–100° C. preferably 60°–95° C. The tray of the column top tray chamber has the same structure as that of FIG. 1. The slurry on said tray is heated by a mixed vapour blown through a number of small holes of bottom plate of the tray chamber from immediately therebelow and a part of the included vinyl chloride monomer is thereby separated by vaporization. Said slurry flows over a weir of the tray as overflow, moves down into the tray of the tray chamber immediately therebelow and while being heated and successively elevating its liquid temperature, goes eventualy to the tray chamber of the lowermost step. The temperature of treated slurry at the column bottom chamber will be in the range of 70° C.–110° C. preferably 80° C.–100° C. by the blowing-in of steam from a blowing port 15.

The treated slurry goes from the tray chamber of the lowermost step, through a discharging pipe 19, a pump 20 and the heat exchanger 22 where it is cooled by the feed slurry, to a receiving vessel 21 for treated slurry. The treated slurry is sent to a dehydrating and drying step (not shown) through a discharge pipe 23 but when the separation of vinyl chloride monomer is insufficient, it is possible to recirculate one part or all of the treated slurry to the slurry tank 11. On the other hand, the mixed steam generated successively in each tray chamber by steam blowing exits from the column top chamber, through a steam discharging pipe 16 to a condenser 17 where it condenses at a temperature higher than the freezing temperature of water under a superatmospheric pressure and is separated into water and vinyl chloride monomer. The vinyl chloride monomer is rectified and reused in polymerization.

The proportion of vinyl chloride resin part in a slurry of vinyl chloride resin used in the method of the present invention (hereinafter often referred to simply as a slurry concentration), % by weight has the intimate relationship with the capacity of plate tower (expressed by $m^3$/hr of slurry), removal property of vinyl chloride monomer and operational condition. A suitable concentration range operable in the method of the present invention is in the range of 5–45% preferably 10–40% and most preferably 15–30%. If it exceeds 45%, the slurry cannot flow down efficiently due to poor fluidity. In the range less than 5%, treating capacity is exceedingly reduced but there is no notable increase of removal efficiency of vinyl monomer.

The treating capacity of a plate column is controlled by retention time if temperature of treatment is fixed and a fixed concentration of treated slurry is used. The amount of liquid retention which determines retention time is determined fundamentally by the sum of the capacity of tray under the level of weir plate 2' (FIG. 1) in each tray chamber. Further, the retention time is influenced by the resistance of the flow path within a column (cross-sectional area of flow path, length of flow path, heads, etc.) to a certain extent but is readily known by actual measurement. It is easy to achieve any value of design by chemical engineering enlargement or reduction of scale.

According to the actual measurement made by the inventors of the present invention, in the case of a 5-plate column, a retention amount of 500 l, a cross-sectional area of 0.01 $m^2$ and a head of 3 m (between the bottom plate of the column top tray chamber and the discharge pipe at a part immediately above the column bottom chamber, i.e. 7' of FIG. 3) it was possible to let a slurry having a slurry concentration of 25% to flow down (retention time of 3 minutes) in an amount of 10 $m^3$/hr. The reason that the retention time can be shortened to such an extent is considered due to the fact that each tray chamber is sealed by liquid seal and the stream of each tray is brought to the state close to a stream within a pipe by the provision of side plates. Of course it is possible to lengthen the retention time to any preferable value by adjusting the feeding velocity of the slurry of vinyl chloride resin within a fixed plate column in order to increase the efficiency of steam treatment.

The slurry treated according to the method of the present invention can reduce its concentration of vinyl chloride monomer easily to less than 10 ppm in case of the use of the one having a concentration of 10,000 ppm, or lower even if the raw material vinyl chloride resin of the slurry is of a lower molecular weight kind from which the removal of monomer is most difficult. When the treated slurry is dehydrated according to a well-known method, vinyl chloride monomer in separated water is undetectable (less than 1 ppm). The concentration of vinyl chloride monomer in the exhaust of hot gas drying applied to the resin by a well-known method after the above-mentioned dehydration is less than 2 ppm.

Further, water washing of said exhaust gas can easily make the amount of vinyl chloride monomer therein non-detectable.

Further the concentration of the vinyl chloride monomer in the product of vinyl chloride resin thus dehydrated and dried is less than 2 ppm or non-detectable. Thus there is no problem of environmental sanitation in the molding and processing of vinyl chloride resin.

When a raw material slurry of vinyl chloride resin used in the method of the present invention has a concentration which is greater than 10,000 ppm and in the neighbourhood of 50,000 ppm, by using such a raw material slurry after being mixed with a part of already treated slurry or by using two of the plate towers of the present invention in succession or separately, it is possible to reduce the concentration of said vinyl chloride monomer down to a range of 2,000 ppm to about 200 ppm in the first tower or in the first time treatment. These treatments can be carried out at a temperature of said slurry in the range of 70°–80° C. in order to avoid the cumulation of heat hysteresis exceeding 80° C. of vinyl chloride resin powder and in most cases such a treatment will be sufficient.

The present invention will be illustrated by way of specific examples which follow hereinafter.

EXAMPLE 1

By using a plate tower (5 plates) constructed as in FIG. 3, having trays of the shape of FIG. 1 (diameter of small holes of 1 mm and ratio of area of 0.2%), a steam treatment of slurry of vinyl chloride resin having a resin concentration of 25% by weight, and a vinyl chloride monomer concentration of 8000 ppm (mean degree of polymerization $\bar{P}$ of 700) was carried out according to the process of FIG. 4.

The plate tower used had a volume of 375 l per one tray, a distance of one tray of 70 cm, a height of weir within the tray of 35 cm and a width of flow path of 17 cm. Said slurry (specific gravity of 1.05) preheated at 80° C. in a heat-exchanger and further in a preheater (not shown) of FIG. 4 was fed to the column top tray chamber of a plate tower 14 of this Fig. at a speed of 9.52 m$^3$/hr. The steam having a temperature of 110° C. was blown from a blowing-in pipe 15 into the column base chamber at a speed of 375 Kg per hour (retention time of 10 minutes). Said slurry heated up to 110° C. by flowing down successively through the trays in the inside of the plate tower, was received in a slurry-receiving vessel 21 by taking out from the lowermost tray of the plate column 14 and passing through an outlet pipe 19, and a pump 20 while being cooled down to a temperature of 50° C. by a heat exchanger 22. The concentration of vinyl chloride monomer in this slurry was 5 ppm (relative to the vinyl chloride resin portion). The mixed vapour of water and vinyl chloride monomer, generated in the column top chamber of the plate column 14 is introduced into a condenser 17 under a superatmospheric pressure (a compressor is not shown) and the condensed water and monomer were separated in a decanter connected to the outlet pipe 18.

Thus 45 Kg/hr of condensed water and 19.99 Kg/hr of vinyl chloride monomer were recovered.

On the other hand the above-mentioned treated slurry was continuously dehydrated by centrifugal dehydration but no vinyl chloride monomer was detected in the discharged water. Further dehydrated vinyl chloride resin was dried in an air stream according to a conventional method whereby the concentration of vinyl chloride monomer in the exhaust air was 0.1 ppm. The vinyl chloride monomer in the dried vinyl chloride resin was 1 ppm.

COMPARATIVE EXAMPLE 1

Figure 5:
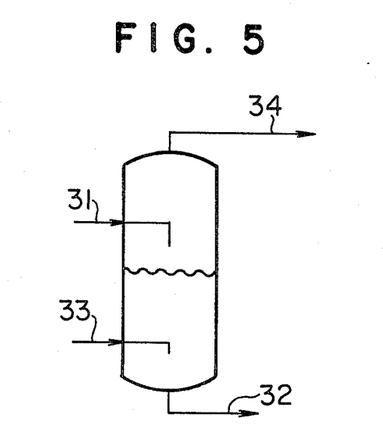
FIG. 5 show an apparatus used for steam treatment of various comparative examples.

A process of example 1 was repeated except that an apparatus of FIG. 5 provided with a vertical 5 m$^3$ tank, a slurry feed inlet 31, a slurry discharge outlet 32, a steam blowing port 33, and a steam withdrawal port 34, was used. However, the amount of retained slurry was 1.6 m$^3$. The concentration of monomer of treated slurry was 640 ppm relative to vinyl chloride resin portion.

By allowing the water in the withdrawn mixed steam to condense (45 Kg/hr) under atmospheric pressure, 18.4 Kg/hr of vinyl chloride monomer could be recovered. In the waste water of the centrifugal dehydration of treated slurry, there was included 2 ppm of vinyl chloride monomer and the concentration of vinyl chloride monomer in the exhaust of air flow drying of dehydrated product was 19.4 ppm.

Further the vinyl chloride portion in the dried vinyl chloride resin was 30 ppm.

When the above-mentioned result is compared with that of example 1, there is a difference of 128 times more vinyl chloride monomer remaining in the product of vinyl chloride resin even if the same kind and the same amount of slurry of vinyl chloride resin is treated with the same amount of steam for the same retention time. Vinyl chloride monomer was detected in the separated discharged water of the treated slurry, the exhaust of air flow drying contained 194 times the amount of monomer and the monomer content in the dried vinyl chloride resin was 30 times as high as that of the above-mentioned example 1. Thus the superior effect of example 1 is evident.

EXAMPLE 2

By using the same plate tower as in example 1 a slurry of vinyl chloride resin (mean degree of polymerization $\bar{P}$ = 700) having a resin concentration of 25% by weight, a vinyl chloride monomer concentration of 40,000 ppm was treated with steam according to the process of FIG. 4. Said slurry preheated at 80° C. in a heat exchanger 22 and further in a preheater (not shown), was fed to the column top chamber of the plate tower 14 of FIG. 4 at a rate of 9.52 m$^3$/hr (10 %/hr) and the steam was blown at a temperature of 110° C. from a blowing-in pipe 15 to the column bottom chamber at a rate of 375 Kg/hr (retention time 10 minutes). The slurry which flowed down successively in the plate tower and was heated at a temperature of 105° C. was received in a slurry receiving vessel 21 after being discharged from the lowest tray of the plate column 14 and passed through a discharge pipe 19 and a pump 20. Meanwhile, it was cooled down to 50° C. by way of a heat exchanger 22. The concentration of vinyl chloride monomer in said slurry (relative to vinyl chloride resin part) was 200 ppm. The mixed vapour of water and vinyl chloride monomer generated in the column top tray chamber of the plate column 14 (having a pressure of 0.25 Kg/cm$^2$G) was charged into a condenser 17 under a superatmospheric pressure. Condensed water and monomer were separated in a decanter connected to an outlet pipe 18. Thus 45 Kg/hr of condensed water and 95 Kg/hr of vinyl chloride were recovered.

The above-mentioned treated slurry was subjected to the same treatment as above-mentioned in a plate tower of FIG. 4 (by using 375 Kg of steam) and the monomer concentration in the retreated slurry thus obtained was 1 ppm. Further from the column top chamber after passing through a condenser 45 Kg/hr of condensed water and 0.0475 Kg/hr of vinyl chloride monomer were recovered.

Further the slurry after the above-mentioned treatment was dehydrated by a centrifugal dehydrator and dehydrated vinyl chloride resin was subjected to air flow drying whereby the concentration of vinyl chloride monomer in the exhaust air was 0.03 ppm and the vinyl chloride monomer content in the dried vinyl chloride resin was not detectable (less than 1 ppm).

COMPARATIVE EXAMPLE 2

The process of example 2 was repeated except that an apparatus of FIG. 5 which is same with that of comparative example 1 was used (i.e. retention amount: 1.6 m$^3$, retention time: 10 minutes). The concentration of monomer of the treated slurry was 2,500 ppm. The mixed vapour was caused to condense under a pressure and water (45 Kg/hr) and vinyl chloride (94 Kg/hr) were recovered. The above-mentioned treated slurry was subjected to the retreatment as the above-mentioned method by using an apparatus of FIG. 5 and the concentration of vinyl chloride monomer in the retreated slurry was 210 ppm. Further, from the column top chamber and through a condenser, 375 Kg/hr of condensed water and 5.7 Kg/hr of vinyl chloride monomer could be recovered. When the dehydrated resin was dried in an air flow drier according to a conventional method, the concentration of vinyl chloride monomer in the exhaust air was 5.4 ppm and the vinyl chloride monomer in the dried vinyl chloride resin was 10 ppm.

If the above-mentioned result is compared with that of example 2, there was a difference of 12.5 times in the concentration of vinyl chloride monomer of the slurry after the first step treatment even when the same kind and the same amount of the slurry of vinyl chloride is treated with the same amount of steam for the same retention time. Similarily there was a difference of 10 times in the concentration of the slurry after the second treatment. Thus it is clear that the effectiveness of the method of the above-mentioned example 2 is superior.

EXAMPLE 3

By using the same plate tower as that of example 1, the treatment of slurry of vinyl chloride resin (mean degree of polymerization $\bar{P}=700$) having a resin concentration of 24% by weight and vinyl chloride monomer concentration of 200 ppm (note: the slurry obtained by the first step steam treatment according to the method of example 2 of the present invention) was carried out according to the process of FIG. 4. The principal conditions and result are shown in Table 1.

TABLE 1

| | Treatment of slurry of vinyl chloride resin with steam | | | | | |
|---|---|---|---|---|---|---|
| | Condition* | | | Result | | |
| Specific and Comparative examples | monomer ppm in slurry | resin wt. % in slurry | amount of steam Kg/hr | monomer ppm in slurry | monomer ppm in dried product** | recovered monomer Kg/hr |
| Specific example 3 | 200 | 25 | 190 | 2 | ND | 0.495 |
| Specific example 4 | 8,000 | 40 | 388 | 5 | 1 | 34 |
| Specific example 5$^\triangle$ | 8,000 | 25 | 375 | 10 | 3 | 20.0 |
| Specific example 6 | 40,000 | 25 | 375 | 10 | ND | 100 |
| Comparative example 3 | 2,000 | 25 | 375 | 70 | 20 | 61 |
| Comparative example 4 | 8,000 | 40 | 388 | 650 | 35 | 31 |
| Comparative example 5$^\triangle$ | 8,000 | 25 | 375 | 750 | 40 | 18 |

Note:
*Common condition of treatment: slurry inlet temperature 80° C. amount of feed 10 m$^3$/hr
$^\triangle$Vinyl chloride-vinyl acetate copolymer (resin containing 5% by weight of vinyl acetate)
**Dry condition: inlet temperature, 110° C.; air in an amount 3-4 times the dried product by weight was used.

As is evident from this Table, even in the case of a slurry of vinyl chloride resin containing a relatively small amount of monomer which has been subjected to the steam treatment of the present invention one time, it is clear that effective separation and recovery of monomer is possible according to the method of the present invention.

COMPARATIVE EXAMPLE 3

By using the apparatus of FIG. 5 which is the same with that of comparative example 1, the treatment of a slurry of vinyl chloride resin (mean degree of polymerization $\bar{P}=700$) containing 24% by weight of vinyl chloride resin and 2000 ppm of vinyl chloride monomer was carried out according to the process of example 3. Principal conditions and results are shown in the Table 1. As evident from this table, even in case of a slurry of vinyl chloride resin which does not have such a high vinyl chloride monomer concentration as in example 1 and comparative example 1 (where the vinyl chloride monomer concentration is 40,000 ppm), it is clear that the blowing of steam into a slurry tank does not provide sufficient separation effectiveness for vinyl chloride monomer.

EXAMPLE 4

By using a plate tower the same as that of example 1, a treatment of slurry of vinyl chloride resin (mean degree of polymerization $\overline{P}=700$) having a vinyl chloride resin concentration of 40% by weight and a vinyl chloride monomer concentration of 8000 ppm was carried out according to the process of FIG. 4. The result of this treatment is shown in Table 1. As is evident from this table, the effect of steam treatment according to a plate tower of the present invention is excellent in case of high concentration of resin in a to be treated slurry.

COMPARATIVE EXAMPLE 4

The process of example 4 was repeated except that an apparatus of FIG. 5 which is the same with that of comparative example 1 was used. The result is shown in Table 1. As evident from this table, the removal effect of vinyl chloride monomer is remarkably poor even when the same slurry of vinyl chloride resin is used for the same retention time and the same temperature and the same amount of steam are used in the treatment.

EXAMPLE 5

By using the same plate tower as that of example 1, a steam treatment of a slurry of vinyl chloride resin (mean degree of polymerization $\overline{P}=800$) of vinyl chloride-vinyl acetate copolymer containing 5% by weight of vinyl acetate, having a resin concentration of 25% by weight and a vinyl chloride monomer concentration of 8000 ppm was carried out according to the process of FIG. 4. The result is shown in Table 1. As evident from the table, even in case of copolymer of vinyl chloride resin, the effectiveness of steam treatment according to a plate tower of the present invention is excellent.

COMPARATIVE EXAMPLE 5

The treatment of example 5 was repeated except that an apparatus of FIG. 5 which is the same as that of comparative example 1 was used. The result is shown in Table 1. It is evident that the removal effect of vinyl chloride monomer is inferior to that of example 5.

EXAMPLE 6

By using a plate tower the same as that of example 1, a treatment of a slurry of vinyl chloride resin (mean degree of polymerization $\overline{P}=1300$) having a vinyl chloride resin concentration of 25% by weight and a vinyl chloride monomer concentration of 40,000 ppm was carried out according to the process of FIG. 4. The result is shown in Table 1.

As evident from the table, even in case of high concentration of vinyl chloride monomer in the to-be-treated slurry, the separation of vinyl chloride monomer is easier with the increase of mean degree of polymerization of vinyl chloride resin.

What is claimed is:

1. A process for removing vinyl chloride monomer obtained by suspension polymerization from an aqueous dispersion of a vinyl chloride resin powder which includes the steps of
    (a) introducing said aqueous dispersion into a stripping zone and allowing it to flow downwardly therethrough,
    (b) causing the downwardly flowing aqueous dispersion to pass through a series of vertically spaced apart horizontal flow stages,
    (c) the aqueous dispersion flowing across each horizontal flow stage being caused to flow along a tortuous channel-like flow path,
    (d) establishing a flow of steam upwardly through the aqueous dispersion that flows in a tortuous path through the lowermost horizontal flow stage by introducing steam from beneath and then upwardly through the horizontally flowing aqueous dispersion thereon, and then passing said steam successively through each horizontal flow stage thereabove,
    (e) the steam introduced in step (d) being in the form of a large number of spaced apart inlet streams each having a diameter of 0.5 to 2 mm,
    (f) the ratio of the total sum of the cross-sectional areas of said steam inlet streams to the cross-sectional area of the horizontally flowing aqueous dispersion through which the steam passes being in the range of 0.0004 to 0.04,
    (g) the pressure in said stripping zone being $-0.803$ to 0.5 kg/cm$^2$ based on gauge, the temperature of the aqueous dispersion while flowing through said stripping zone being between 50° and 110° C., and the retention time of the aqueous dispersion in the stripping zone ranging between 1 and 90 minutes.

2. A process according to claim 1 wherein the temperature of the aqueous dispersion fed to said stripping zone is in the range of 50°-100° C., the temperature of the aqueous dispersion flowing through the horizontal stages is in the range of 50°-110° C. and the temperature of aqueous dispersion discharged from said stripping zone is in the range of 60°-110° C.

3. The process according to claim 1 or claim 2 wherein the retention time of the aqueous dispersion in a horizontal flowing stage is in the range of 1–60 minutes.

4. The process according to claim 1 or claim 2 wherein said vinyl chloride resin is a copolymer of vinyl chloride with another vinyl monomer containing at least 50% by weight of vinyl chloride unit.

* * * * *